US012578992B2

(12) United States Patent
Chajdas et al.

(10) Patent No.: US 12,578,992 B2
(45) Date of Patent: Mar. 17, 2026

(54) WORK GRAPH SCHEDULER IMPLEMENTATION

(71) Applicant: Advanced Micro Devices, Inc., Santa Clara, CA (US)

(72) Inventors: Matthäus G. Chajdas, Munich (DE); Michael J. Mantor, Orlando, FL (US); Rex Eldon McCrary, Orlando, FL (US); Christopher J. Brennan, Boxborough, MA (US); Robert Martin, Boxborough, MA (US); Dominik Baumeister, Munich (DE); Fabian Robert Sebastian Wildgrube, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/936,788

(22) Filed: Sep. 29, 2022

(65) Prior Publication Data

US 2024/0111574 A1     Apr. 4, 2024

(51) Int. Cl.
*G06F 9/40*        (2006.01)
*G06F 9/48*        (2006.01)
(Continued)

(52) U.S. Cl.
CPC ........ *G06F 9/4881* (2013.01); *G06F 11/3024* (2013.01); *G06F 11/3055* (2013.01); *G06T 1/20* (2013.01)

(58) Field of Classification Search
CPC ............... G06F 9/4881; G06F 11/3024; G06F 11/3055; G06T 1/20
See application file for complete search history.

(56) References Cited

U.S. PATENT DOCUMENTS

2017/0236246 A1* 8/2017 Mrozek ..................... G06T 1/20
345/522
2021/0374607 A1 12/2021 Kazakov et al.
(Continued)

FOREIGN PATENT DOCUMENTS

EP        3680774 A1     7/2020

OTHER PUBLICATIONS

Rafique et al.; Synthesis of Heterogeneous Dataflow Models from Synchronous Specifications; 2021; IEEE (Year: 2021).*
(Continued)

*Primary Examiner* — Corey S Faherty
(74) *Attorney, Agent, or Firm* — Kowert, Hood, Munyon, Rankin & Goetzel, P.C.; Rory D. Rankin

(57)        ABSTRACT

Systems, apparatuses, and methods for implementing a hierarchical scheduler. In various implementations, a processor includes a global scheduler, and a plurality of independent local schedulers with each of the local schedulers coupled to a plurality of processors. In one implementation, the processor is a graphics processing unit and the processors are computation units. The processor further includes a shared cache that is shared by the plurality of local schedulers. Each of the local schedulers also includes a local cache used by the local scheduler and processors coupled to the local scheduler. To schedule work items for execution, the global scheduler is configured to store one or more work items in the shared cache and convey an indication to a first local scheduler of the plurality of local schedulers which causes the first local scheduler to retrieve the one or more work items from the shared cache. Subsequent to retrieving the work items, the local scheduler is configured to schedule the retrieved work items for execution by the coupled processors. Each of the plurality of local schedulers is
(Continued)

*Method*
*700* configured to schedule work items for execution independent of scheduling performed by other local schedulers.

22 Claims, 7 Drawing Sheets

(51) Int. Cl.
  *G06F 11/30*          (2006.01)
  *G06T 1/20*          (2006.01)

(56)                    References Cited

U.S. PATENT DOCUMENTS

2022/0019475 A1*  1/2022  Dobson ................. G06F 9/5083
2022/0291952 A1*  9/2022  Milojicic  ................ G06F 9/505

OTHER PUBLICATIONS

Shan et al.; Scheduling in Heterogeneous Grid Environments: The Effects of Data Migration; 2004 (Year: 2004).*
International Search Report and Written Opinion in International Application No. PCT/US2023/074869, mailed Jan. 26, 2024, 11 pages.
Matthew Dellinger et al: "ChronOS Linux: A best-effort real-time multiprocessor Linux kernel", Design Automation Conference (DAC), 2011 48th ACM/EDAC/IEEE, IEEE,Jun. 5, 2011 (Jun. 5, 2011), pp. 474-479.
Mehrdad Kiamari; GCNScheduler: "Scheduling Distributed Computing Applications Using Graph Convolutional Networks," University of Southern California, Los Angeles, pp. 1-17.
Michael A. Baker; "A Lightweight Run-time Scheduler for Multitasking Multicore Stream Applications," Arizona State Uiversity and U.S. Army Research Laboratory, pp. 1-8.

* cited by examiner

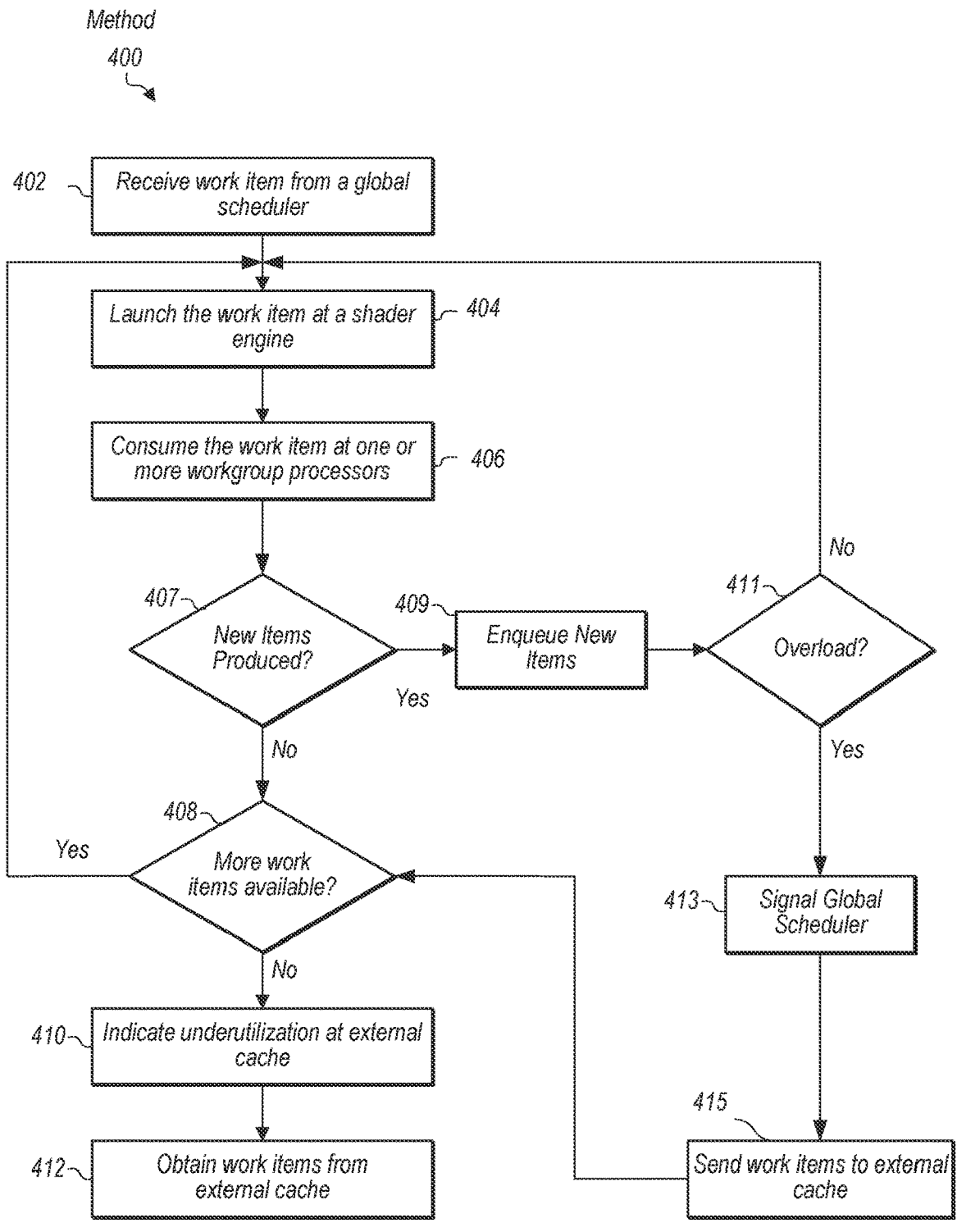

*Method*
*400*

402 — Receive work item from a global scheduler

Launch the work item at a shader engine — 404

Consume the work item at one or more workgroup processors — 406

407 — New Items Produced?

409 — Enqueue New Items

411 — Overload?

No

Yes

Yes

No

408 — More work items available?

Yes

No

410 — Indicate underutilization at external cache

412 — Obtain work items from external cache

413 — Signal Global Scheduler

415 — Send work items to external cache

*FIG. 4*

*Method*

*500*

502 — Schedule work items

504 — Queue empty?

Yes / No

506 — Work item to enqueue?

No

510 — *Notify Global Scheduler that Shader needs work*

Yes

508 — Draw call?

No

End

Yes

512 — Send draw call

514 — Enqueue work items

*Method*

*600*

601 — Monitor Command Queue

602 — Detect Indication?

No

Yes

604 — Identify one or more WGPs and Work Item Location(s)

606 — Launch work items to WGP(s)

*Method*

700

WORK GRAPH SCHEDULER IMPLEMENTATION

BACKGROUND

Description of the Related Art

Graphics processing applications often include work streams of vertices and texture information and instructions to process such information. The various items of work (also referred to as "commands") may be prioritized according to some order and enqueued in a system memory buffer to be subsequently retrieved and processed. Schedulers receive instructions to be executed and generate one or more commands to be scheduled and executed at, for example, processing resources of a graphics processing unit (GPU).

In conventional parallel processors for hierarchical work scheduling, a local scheduler may reside outside of a shader engine such that the local scheduler needs to communicate through additional levels of hierarchy thereby increasing latency and therefore work items in work queues may have longer scheduling times.

In view of the above, improved systems and methods for hierarchical scheduling of work items in parallel processors are needed.

BRIEF DESCRIPTION OF THE DRAWINGS

The advantages of the methods and mechanisms described herein may be better understood by referring to the following description in conjunction with the accompanying drawings, in which:

FIG. 4 is a generalized flow diagram illustrating hierarchical scheduling of work items.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a hierarchical scheduler in a computing system as described herein. In various implementations, a processor includes a global scheduler configured to communicate with a plurality of local schedulers, where each of the local schedulers is coupled to a plurality of processors. In one implementation, the processor is a graphics processing unit and the processors are computation units. The processor further includes a shared cache that is shared by the plurality of local schedulers. Each of the local schedulers also includes a local cache used by the local scheduler and processors coupled to the local scheduler. To schedule work items for execution, the global scheduler is configured to store one or more work items in the shared cache and convey an indication to a first local scheduler of the plurality of local schedulers which causes the first local scheduler to retrieve the one or more work items from the shared cache. Subsequent to retrieving the work items, the local scheduler is configured to schedule the retrieved work items for execution by the coupled processors. Additionally, each of the plurality of local schedulers is configured to schedule work items for execution independent of scheduling performed by other local schedulers and no direct communication between the local schedulers is required or present in various implementations. These and other features are described herein.

Figure 1:
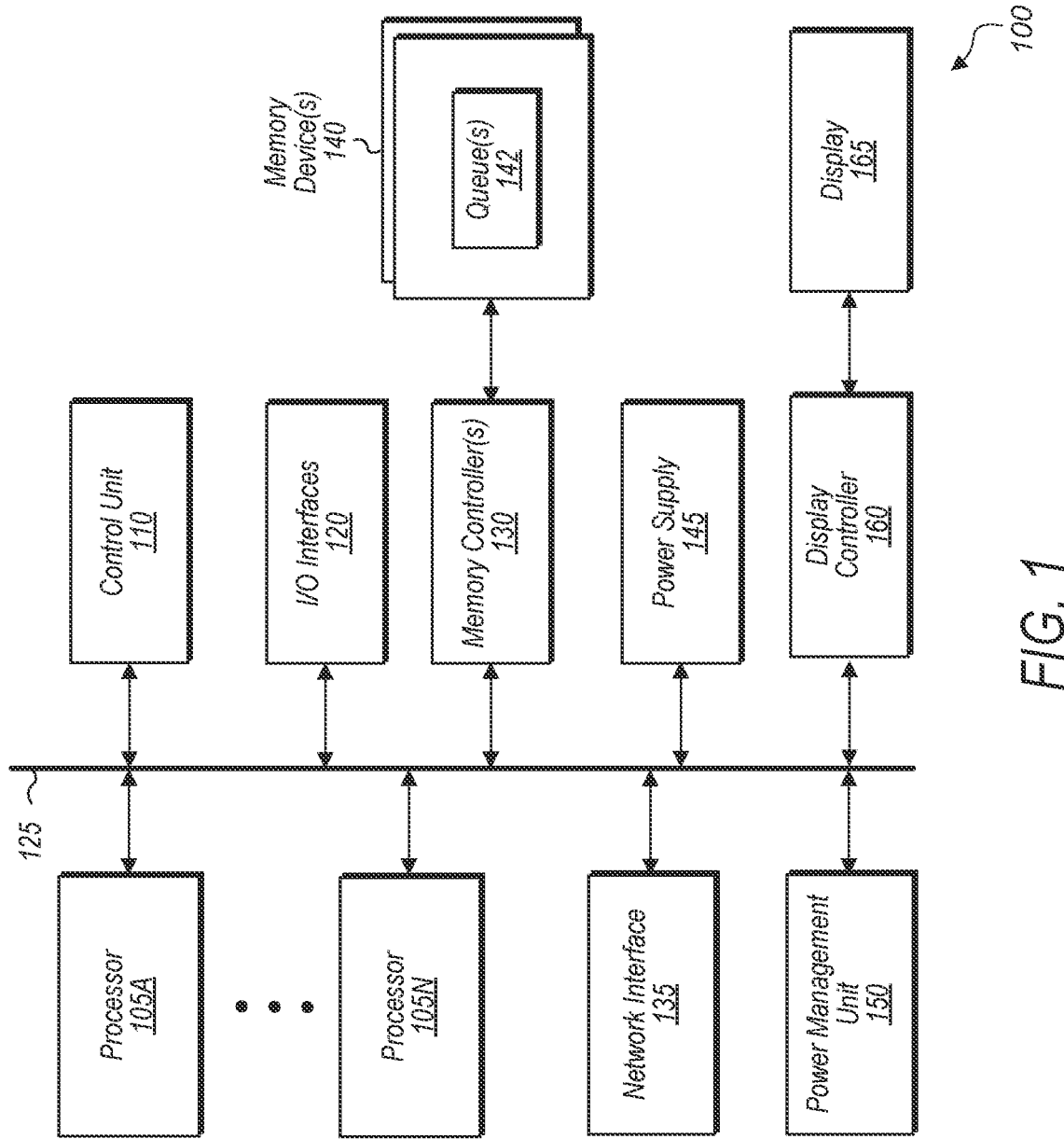
FIG. 1 is a block diagram of one implementation of a computing system.

Referring now to FIG. 1, a block diagram of one implementation of a computing system 100 is shown. In one implementation, computing system 100 includes at least processors 105A-N, control unit 110, input/output (I/O) interfaces 120, bus 125, memory controller(s) 130, network interface 135, memory device(s) 140, power supply 145, power management unit 150, display controller 160, and display 165. In other implementations, computing system 100 includes other components and/or computing system 100 is arranged differently. Processors 105A-N are representative of any number of processors which are included in system 100, with the number of processors varying from implementation to implementation.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In one implementation, processor 105N is a GPU which provides pixels to display controller 160 to be driven to display 165. In some implementations, processors 105A-N include multiple data parallel processors. In one implementation, control unit 110 is a software driver executing on processor 105A. In other implementations, control unit 110 includes control logic which is independent from processors 105A-N and/or incorporated within processors 105A-N. Generally speaking, control unit 110 is any suitable combination of software and/or hardware.

Memory controller(s) 130 is representative of any number and type of memory controllers accessible by processors 105A-N. Memory controller(s) 130 is coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, media recording devices, external storage devices, network interface cards, and so forth. Network interface 135 is used to receive and send network messages across a network. Bus 125 is representative of any type of bus or fabric with any number of links for connecting together the different components of system 100.

In one implementation, queue(s) 142 are located in memory devices(s) 140. In other implementations, queue(s) 142 are stored in other locations within system 100. Queue(s) 142 are representative of any number and type of queues which are allocated in system 100. In one implementation, queue(s) 142 store rendering tasks that are to be performed for frames being rendered. In one implementation, the rendering tasks are enqueued in queue(s) 142 based on inputs received via network interface 135. For example, in one scenario, the inputs are generated by a user of a video game application and sent over a network (not shown) to system 100. In another implementation, the inputs are generated by a peripheral device connected to I/O interfaces 120.

In one implementation, power management unit 150 manages the supply of power from power supply 145 to components of system 100, and power management unit 150 controls various power-performance states of components within system 100. Responsive to receiving updates from control unit 110, the power management unit 150 causes other components within system 100 to either increase or decrease their current power-performance state. In various implementations, changing a power-performance state includes changing a current operating frequency of a device and/or changing a current voltage level of a device. When the power-performance states of processors 105A-N are reduced, this generally causes the computing tasks being executed by processors 105A-N to take longer to complete.

In one implementation, control unit 110 sends commands to power management unit 150 to cause one or more of processors 105 to operate at a relatively high power-performance state responsive to determining that a number of tasks for the processor exceeds a threshold, needs to meet a certain quality of service requirement, or otherwise.

In various implementations, computing system 100 is a computer, laptop, mobile device, server, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1 and/or one or more of the components shown in computing system 100 are omitted. Additionally, in other implementations, computing system 100 is structured in other ways than shown in FIG. 1.

Figure 2:
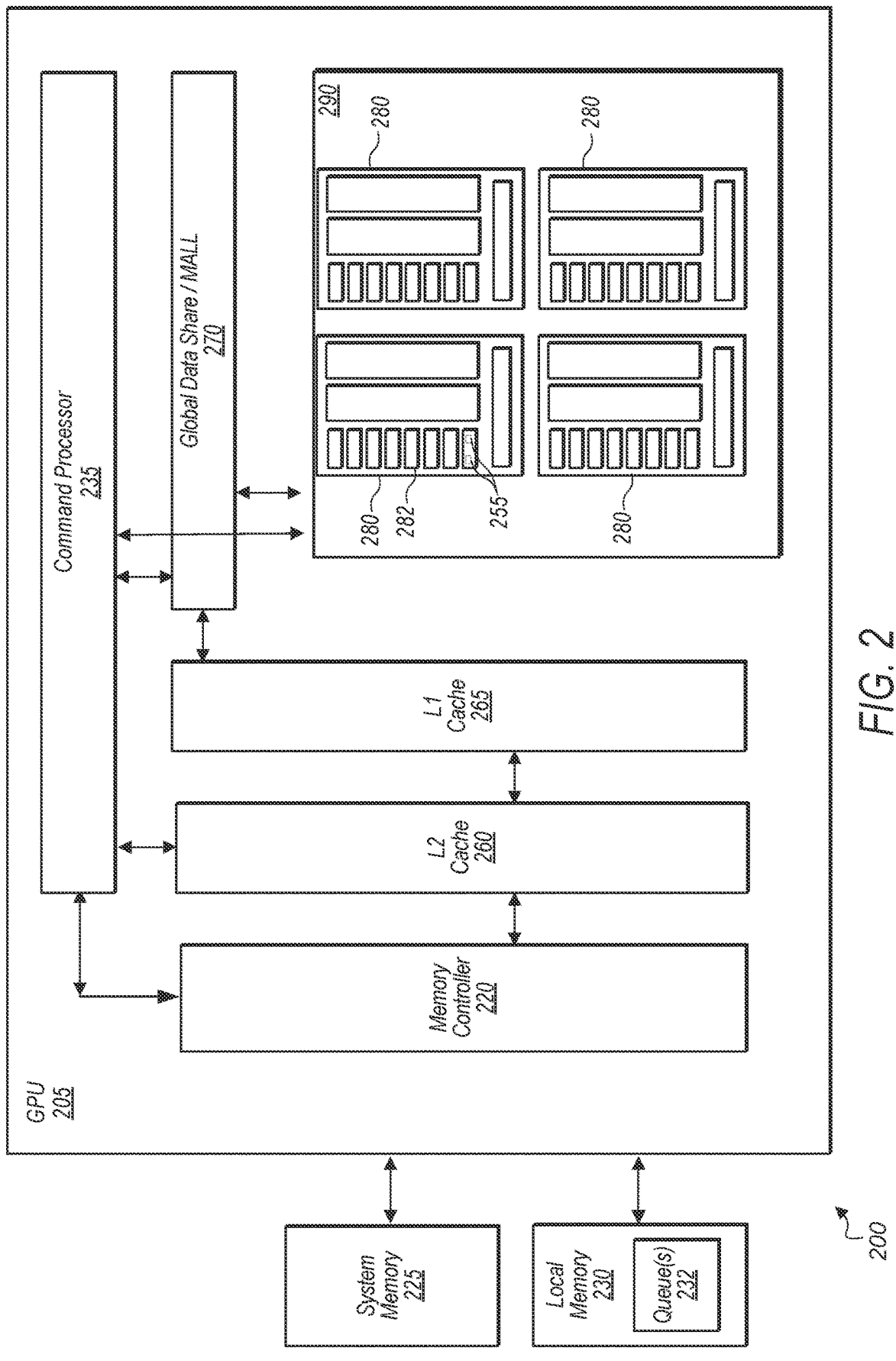
FIG. 2 is a block diagram of one implementation of a graphical processing unit.

Turning now to FIG. 2, a block diagram of another implementation of a computing system 200 is shown. In one implementation, system 200 includes GPU 205, system memory 225, and local memory 230 which belongs to GPU 205. System 200 also includes other components which are not shown to avoid obscuring the figure. GPU 205 includes at least command processor 235 (also referred to as a "global scheduler"), shader engines 280, memory controller 220, shared cache 270, level one (L1) cache 265, and level two (L2) cache 260. In one implementation, each of the shader engines 280 includes a plurality of workgroup processors 282, with each including one or more compute units 255. In various implementations, each compute unit include one or more single-instruction-multiple-data (SIMD) processors. It is noted that compute units 255 can also be referred to herein as a "plurality of processing elements". In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches rendering tasks to be performed on GPU 205. Command processor 235 receives commands from the host CPU and issues corresponding rendering tasks to compute units 255. Rendering tasks executing on compute units 255 read and write data to global data share 270, L1 cache 265, and L2 cache 260 within GPU 205. Although not shown in FIG. 2, in one implementation, compute units 255 also include one or more caches and/or local memories within each compute unit 255. In various implementations, compute units 255 execute any number of frame-based applications which are rendering frames to be displayed, streamed, or consumed in real-time. In one implementation, queue(s) 232 are stored in local memory 230. In other implementations, queue(s) 232 are stored in other locations within system 200. Queue(s) 232 are representative of any number and type of queues which are allocated in system 200. In one implementation, queue(s) 232 store rendering tasks to be performed by GPU 205.

In one implementation, the performance setting of GPU 205 is adjusted based on a number of rendering tasks for the current frame stored in queue(s) 232 as well as based on the amount of time remaining until the next video synchronization signal. In various implementations, the performance setting of GPU 205 is adjusted so as to finish the rendering tasks before the next video synchronization signal while also achieving a power consumption target. In one implementation, the performance setting is adjusted by a control unit (not shown). The control unit can be a software driver executing on a CPU (not shown) or the control unit can include control logic implemented within a programmable logic device (e.g., FPGA) or control logic implemented as dedicated hardware (e.g., ASIC). In some cases, the control unit includes a combination of software and hardware.

In one implementation, the performance setting of GPU 205 corresponds to a specific power setting, power state, or operating point of GPU 205. In one implementation, the control unit uses dynamic voltage and frequency scaling (DVFS) to change the frequency and/or voltage of GPU 205 to limit the power consumption to a chosen power allocation. Each separate frequency and voltage setting can correspond to a separate performance setting. In one implementation, the performance setting selected by the control unit controls a phase-locked loop (PLL) unit (not shown) which generates and distributes corresponding clock signals to GPU 205. In one implementation, the performance setting selected by the control unit controls a voltage regulator (not shown) which provides a supply voltage to GPU 205. In other implementations, other mechanisms can be used to change the operating point and/or power settings of GPU 205 in response to receiving a command from the control unit to arrive at a particular performance setting.

In various implementations, the shader engines 280 correspond to different scheduling domains. In an implementation, each shader engines 280 further includes a local workgraph scheduler (WGS) (also interchangeably referred to as a local scheduler), associated with a set of workgroup processors (WGP) 282, a local cache, and an asynchronous dispatch controller (ADC). The various schedulers and command processors described herein handle queue-level allocations. During execution of work, the WGS executes work locally in an independent manner. In other words, the workgroup scheduler of a given shader engine can schedule work without regarding to local scheduling decisions of other shader engines, i.e., the WGS does not interact with other WGS of other scheduling domains. Instead, the local scheduler uses a private memory region for scheduling and as scratch space. An example implementation of a processor including the above elements is illustrated in FIG. 3.

Figure 3:
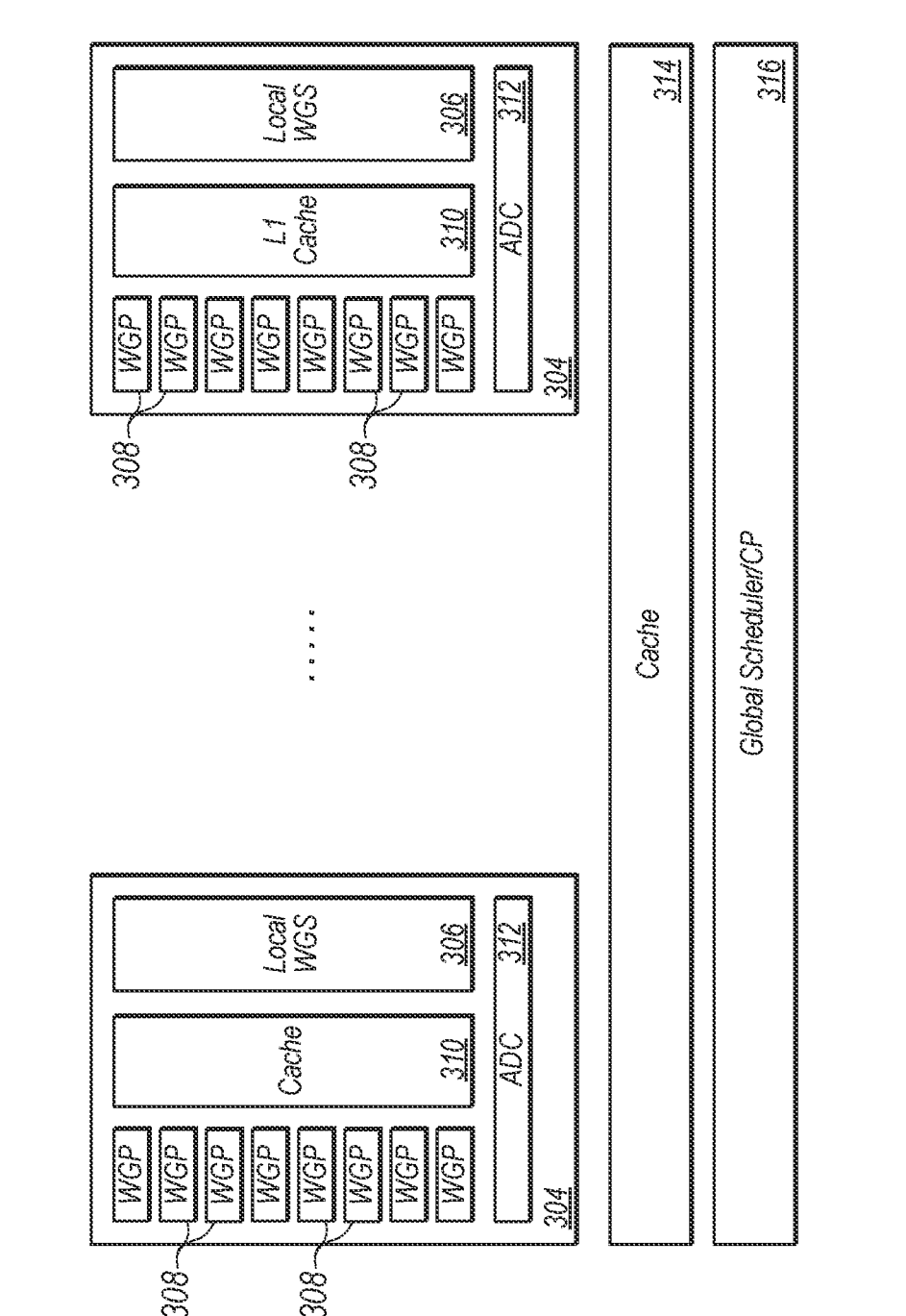
FIG. 3 is a block diagram illustrating a parallel processor implementing hierarchical schedulers.

Turning now to FIG. 3, a parallel processor 300 implementing hierarchical scheduling domains is shown. In an implementation, the parallel processor 300 includes a plurality of scheduling domains 304. Each scheduling domain 304 corresponds to a shader engine. As shown, each shader engine 304 includes a plurality of workgroup processors (WGP) 308, with each including one or more compute units (not shown). Each of the shader engines 304 is configured to execute a plurality of work items received from a command processer (also referred to as a "global scheduler") 316 external to the scheduling domain 304. In an implementation, each scheduling domain further includes a local workgraph scheduler (WGS) 306 (or "Local scheduler"), and a local cache 310. Each shader engine 304 further comprises an asynchronous dispatch controller (ADC) 312 configured to launch locally scheduled work for distribution of work items received by the global processor 316. In one implementation, the ADC 312 can execute launcher threads to the WGS 306 by picking one or more work items from an external cache 314. In various implementations, while each of shader engines 304 includes a local cache 310, cache 314 is shared by the shader engines 304. In this manner, data can be communicated between shader engines 304. In an exemplary implementation, each of the WGS and global scheduler may have access to individual mailboxes that may be used by a given entity to communicate with another entity in the system without the use of a main memory subsystem of the parallel processor 300. In one example, a dedicated mailbox 320 for the global scheduler may be located in cache 314. Further, each WGS 306 may also have a dedicated mailbox 322, which in one implementation, may be located in cache 310 associated with WGS 306. Other possible locations of the dedicated mailboxes are contemplated and are within the scope of the present disclosure.

In an implementation, the WGS 306 is configured to directly access the local cache 310, thereby avoiding the need to communicate through higher levels of the scheduling hierarchy. In this manner, scheduling latencies are reduced and a finer grained scheduling can be achieved. That is, WGS 306 can schedule work items faster to the one or more WGP 308 and on a more local basis. Further, the structure of the shader engine 304 is such that a single WGS 306 is available per shader 304, thereby making the shader engine 304 more easily scalable. For example, because each of the shader engines 304 is configured to perform local scheduling, additional shader engines can readily be added to the processor.

In operation, the WGS 306 is configured to communicate with the one or more WGP 308 via the local cache 310. The WGS 306 is further configured to receive a first set of work items from the global processor 316 and schedule the first set of work items for execution by the WGPs 308. In one implementation, the first set of work items are launched by the ADC 312 as wave groups via the local cache 310. The ADC 312, being located directly within the shader engine 304, builds the wave groups to be launched to the one or more WGPs 308. In one implementation, the WGS 306 schedules the work items to be launched to the one or more WGP 308 and then communicates a work schedule directly to the ADC 312 using local atomic operations (or "functions"). In an implementation, the scheduled work items are stored in one or more local work queues stored at the local cache 310. Further, the ADC 312 builds wave groups comprising the scheduled work items stored at the one or more local work queues, and then launches the scheduled work items as wave groups to the one or more WGP 308. In some implementations, however, one or more WGPs can also be configured to support a given local scheduler running on the WGS to offload processing tasks, thereby assisting the WGS in scheduling operations.

In an implementation, once the first set of work items are consumed at the one or more WGP 308, the WGS 306 may notify the global processor 316 through the external cache 314 using one or more global atomic operations. In one example, the WGS 306 writes an underutilization signal to the external cache 314 to indicate that it is currently being underutilized (i.e., is capable of performing more work than it is currently performing). The global processor 316 detects the underutilization indication by accessing the external cache 314. In one implementation, responsive to detection of such an underutilization indication, the global processor 316 is configured to identify a second set of work items for the WGS 306. In one example, the global processor 316 queries one or more different shader engines 302, in the same hierarchical level, to identify surplus work items from such one or more shader engines 302. Once such work items are identified, these work items are stored in the external cache 314, from where these are scheduled by the WGS 306 and launched by the ADC 312 to the one or more WGP 308.

As described in the foregoing, the parallel processor 300 comprises a plurality of shader engines 302, each having at least one WGS 306 for local scheduling operations. In one implementation, each WGS 306 in a given shader engine is configured to operate independently of WGS 306 in one or more other shader engine 302. That is, a WGS 306 for a given shader engine 302 does not communicate with other WGS 306 situated in another shader engine 302.

Turning now to FIG. 4, one implementation of a method 400 for scheduling of work items is shown. A local scheduler receives one or more work items from a global scheduler (block 402). In an implementation, the local scheduler is comprised within a shader engine of a parallel processor. The local scheduler, in one example, picks the one or more work items from an external cache associated with the global scheduler. Once the local scheduler obtains the work items for consumption, the local scheduler schedules new work items for execution by the workgroup processors of the shader engine. Dispatch of the work items to the workgroup processors is accomplished via an asynchronous dispatch controller (ADC) that dispatches/launches the one or more work items to one or more workgroup processors comprised within the shader engine (block 404). In one implementation, the local scheduler writes the work items to a local queue in a local cache of the shader engine, from which the ADC launches the work items to the one or more workgroup processors. In addition, WGPs are configured to allocate, deallocate, and use the local cache memory as needed during processing. In various implementations, if the identified work item(s) are too large to dispatch, the work is partitioned into smaller work items before enqueuing them for dispatch.

When the local scheduler has enqueued work items for dispatch, the local scheduler stores an indication (e.g., a command) for the ADC to indicate the work is ready for execution. For example, commands may be enqueued in a command queue that is monitored by the ADC. When the ADC detects such a command, the ADC initiates a launch of the work items to the workgroup processors. In one implementation, the ADC communicates with the workgroup processors to identify where the work to be consumed is located within the local cache. In response to the indication from the ADC, the one or more work items can be consumed by the one or more workgroup processors (block 406). When a work item is processed by a workgroup processor, zero, one, or more new work items may be produced. If new items are produced (block 407), they are enqueued or otherwise locally stored (block 409) and a determination is made as to whether the shader engine is deemed to be overloaded due to an excess amount of work (block 411). In various implementations, determining the shader engine is overloaded includes a comparison of a number of work items to a threshold, a number of work items currently waiting to be locally scheduled (i.e., pending work items), and so on. If such a condition is not detected, then the process returns to block 404 where processing continues.

If an overload condition is detected (block 411), then the global scheduler is notified (block 413), and one or more work items are sent (or "exported") from the shader engine to an external shared cache 415. In this manner, work items are transferred from one shader engine to another shader engine. In various implementations, when an overload condition is detected, the local scheduler conveys a signal, stores an indication in a location accessible to the global scheduler, or otherwise, to alert the global scheduler. After exporting one or more work items, if work items remain within the shader engine (block 408), processing continues at block 404. Otherwise, if it is determined by the local scheduler that no work items are available to schedule (conditional block 408, "no" leg), the local scheduler provides an underutilization indication at the external cache of the global processor (block 410). In an implementation, the global processor detects the underutilization indication via the external cache and conveys a corresponding indication to another shader engine. In response, the other shader engine exports surplus work items and writes them to the external shared cache to make them available for redistribution. After the new work items are available at the external cache, the local scheduler can retrieve (or otherwise receive) the new work items to be scheduled (block 412) and write them to its local cache. Once the new work items are picked by the local scheduler, the method continues to block 404, wherein the ADC can launch the new work items for consumption at the one or more workgroup processors as described above.

Figure 5:
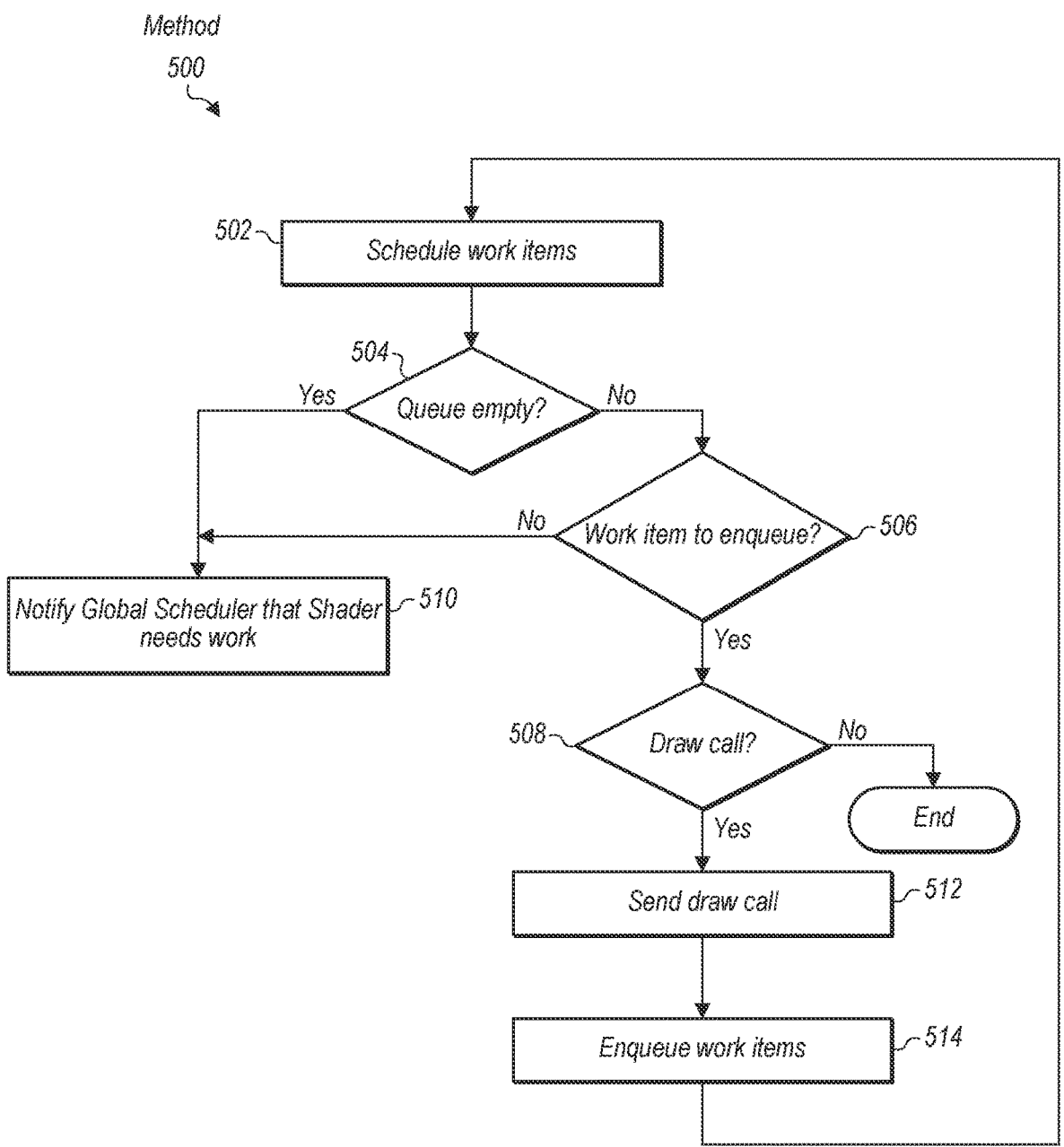
FIG. 5 is a generalized flow diagram illustrating local scheduling of work items in a parallel processor.

Turning now to FIG. 5, one implementation of a method 500 for local scheduling of work items is shown. A local scheduler of a shader engine is configured to schedule one or more work items for processing by workgroup processors of the shader engine (block 502). In an example, the local scheduler can use local atomic operations to schedule work items written to a local queue in a local cache of the shader engine. In case the local scheduler determines that the local queue is empty (conditional block 504, "yes" leg), the local scheduler can notify a global scheduler (e.g., the command processor 316 of FIG. 3) that the local scheduler has no work to schedule. In response, the global scheduler is configured to determine if other shader engines have excess work available. If so, the global scheduler causes the other shader engine(s) to export the excess work by storing it in a cache shared by the shader engines (e.g., cache 314 of FIG. 3). The global scheduler then schedules the exported work to the shader engine that had previously indicated it had no work. In response, the local scheduler retrieves and schedules the work for execution on the shader engine. In this manner, work that would have remained enqueued on the other shader engine can begin execution and overall parallelism and performance is increased. This may be referred to as "stealing work" from another shader engine and the indication provided by a shader engine that it is out of work can be referred to as a "work steal" indication (block 510). In an implementation, the local scheduler can send the work steal by storing an underutilization indication at an external cache of the global processor.

Otherwise, if the local queue is not empty (conditional block 504, "no" leg), the local scheduler determines whether work items are available to enqueue (conditional block 506). If there are no work items to be enqueued (conditional block 506, "no" leg), the local scheduler again sends a work steal as shown in block 510. Otherwise, if work items are available to be enqueued (conditional block 506, "yes" leg), the local scheduler further determines if at least one work item comprises a draw call (conditional block 508). If no work item indicates a draw call, the method 500 may terminate (conditional block 508, "no" leg). Otherwise, the local scheduler issues the draw call (block 512). The local scheduler can then again enqueue work items to be scheduled (block 514) and the method 500 can continue to block 502, wherein these enqueued work items are scheduled by the local scheduler.

Figure 6:
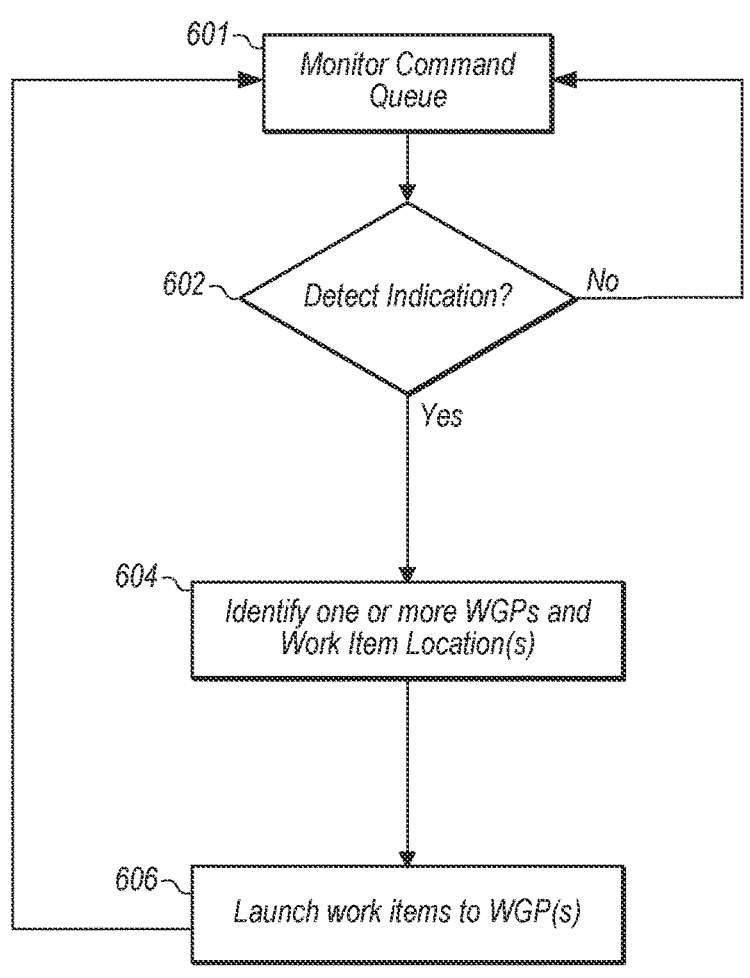
FIG. 6 is a generalized flow diagram illustrating a method of launching work items by a local dispatch controller.

Turning now to FIG. 6, one implementation of a method 600 for launching work items by a dispatch controller (ADC) is shown. In various implementations, when the local scheduler of a shader engine initiates scheduling of work items, it stores or otherwise conveys an indication that is detectable by the ADC. The indication includes a command that is stored in a command queue that is monitored by the ADC (601). If the ADC determines that work items to be launched are available (conditional block 602, "yes" leg), the ADC initiates launch of the available work items to the workgroup processors. The ADC identifies one or more WGP to which work is to be distributed and where the work items are currently stored in the local cache (block 604). For example, in one implementation the WGP(s) and work item location(s) are indicated by the command. Based on this command, the ADC communicates with the identified WGP(s) to cause them to consume the work items (block 606). In case it is determined by the ADC that no work items are available to be launched (conditional block 602, "no" leg), the ADC continues monitoring (block 601).

Figure 7:
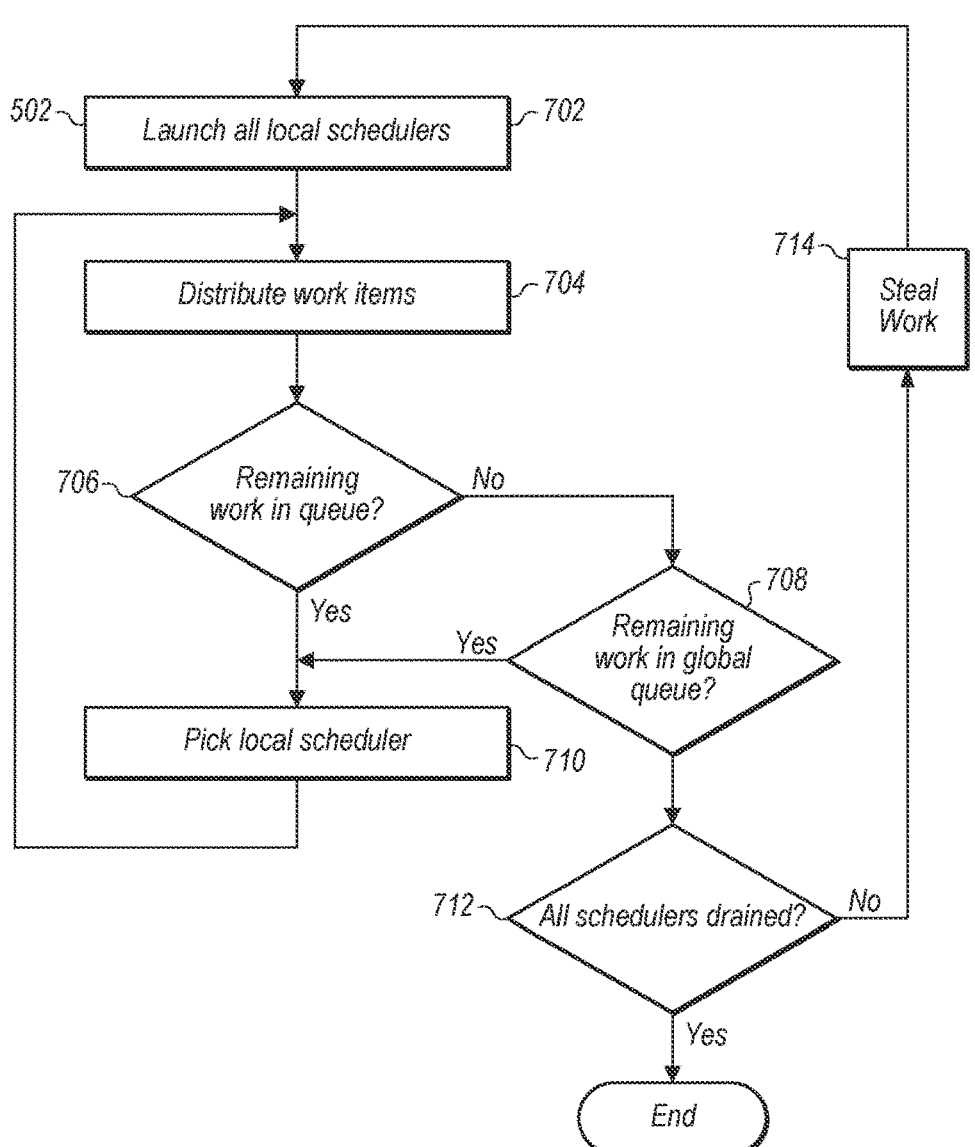
FIG. 7 is a generalized flow diagram illustrating a method of global work scheduling by a processor.

Turning now to FIG. 7, one implementation of a method for global scheduling of work items is shown. A global scheduler launches all local schedulers in a given hierarchy (block 702). For example, with reference to FIG. 3, all local schedulers 306 of shader engines 304 corresponds to a same level in the scheduling hierarchy. Once these local schedulers are launched, the global processor distributes the work items to each launched local scheduler (block 704). In an implementation, the global processor can distribute work items to the local schedulers by storing the work items in an external shared cache (e.g., cache 314 of FIG. 3). Further, the external cache may store these work items in a work queue local to the global processor, from where these are distributed to the local schedulers by the global processor. The global scheduler can then communicate a signal directly to local schedulers indicating work is available and where it is stored. In response, the local schedulers can retrieve and schedule work items as described in FIG. 5.

The global processor can then determine whether one or more work items are remaining for distribution (conditional block 706). If the global processor determines that work items are available in the local queue (conditional block 706, "yes" leg), the global processor selects a local scheduler for distribution of the remaining work items (block 710). Otherwise, if no work items remain in the local queue (conditional block 706, "no" leg), the global processor determines whether work items for distribution are present in a global queue (conditional block 708). If such work items are available (conditional block 708, "yes" leg), the method 700 continues to block 710 where global processor picks one or more local schedulers for distribution of the work items. Otherwise, if no such work items remain (conditional block 708, "no" leg), the global processor can determine if all local schedulers are drained (i.e., have completed their work) (conditional block 712). If the global processor determines that all the local schedulers are drained (conditional block 712, "yes" block), the method 700 ends. However, if all local schedulers are not drained (conditional block 712, "no" block), the global scheduler attempts to steal work from one or more shader engines for distribution to other shader engines (block 714). As discussed above, when a shader engine has excess work, such work can be redistributed to other shader engines that have no (or less) work in order to increase overall performance. The method 700 continues to block 702 and the process repeats.

In some implementations, local schedulers are configured to monitor/poll a memory location(s) for an indication that work is available. For example, a dedicated memory location (or "mailbox") is maintained for each local scheduler where a semaphore type indication is maintained. When the global scheduler has work for a given local scheduler, the global scheduler stores an indication or message for the given local scheduler in its mailbox. In various implementations, the local scheduler can use this mailbox to communicate with the global scheduler. For example, the local scheduler can inform the global scheduler that it needs more work by writing to the mailbox. These and other implementations are possible and are contemplated.

In other implementations, each local scheduler in the shader engines (i.e., the WGS) may have access to dedicated mailboxes to communicate with the global scheduler in a point-to-point fashion. That is, whenever a local scheduler communicates with the global scheduler (e.g., for conveying work steal, overload, or other indications), the local scheduler sends a message directly to a dedicated mailbox associated with the global scheduler bypassing an internal memory subsystem of the parallel processor. Further, the global scheduler can access the messages stored in the dedicated mailbox and respond with appropriate messages that are in turn stored at the dedicated mailbox of the local scheduler. In an implementation, each local scheduler may only access a single mailbox while the global scheduler may access multiple mailboxes. In several other implementations, one or more mailboxes may also be implemented in workgraph processors (WGPs) based on various implementations of the parallel processor described herein. In an example, each WGP may be associated with a dedicated mailbox, and similar to mailboxes implemented for the local schedulers, each WGP may only access a single mailbox at a time to communicate individually with another WGP, a local scheduler or the global scheduler.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a shared cache;
   a global scheduler comprising circuitry configured to store one or more work items in the shared cache;
   a plurality of local schedulers including at least a first local scheduler and a second local scheduler, each coupled to a plurality of processors; and
   circuitry, configured to cause transfer of a work item from the first local scheduler to the second local scheduler, the circuitry being configured to:
   cause circuitry of the first local scheduler to store a selected work item in the shared cache; and
   convey an indication to the second local scheduler that causes circuitry of the second local scheduler to retrieve the selected work item from the shared cache.

2. The processor as recited in claim 1, wherein each of the local schedulers is coupled to a local cache, and each local scheduler is configured to store work items to be executed in the local cache.

3. The processor as recited in claim 2, wherein each of the local schedulers is coupled to a dispatch controller configured to launch work items stored in the local cache for execution.

4. The processor as recited in claim 3, wherein the dispatch controller is configured to monitor a command queue configured to store a command from a local scheduler that indicates work items ready for execution have been stored in the local cache.

5. The processor as recited in claim 1, wherein each of the plurality of local schedulers is configured to schedule work items for execution independent of other local schedulers.

6. The processor as recited in claim 1, wherein to schedule the one or more work items for execution, the global scheduler is configured to:
   store the one or more work items in the shared cache; and
   convey an indication to a first local scheduler of the plurality of local schedulers, to cause the first local scheduler to retrieve the one or more work items from the shared cache.

7. The processor as recited in claim 6, wherein the indication identifies a location in the shared cache where the one or more work items are stored.

8. The processor as recited in claim 1, wherein the processor is configured to transfer the work item from the first local scheduler to the second local scheduler without direct communication between the first local scheduler and the second local scheduler.

9. A method comprising:
   storing, by circuitry of a global scheduler of a processor, one or more work items in a shared cache;
   retrieving, by circuitry of a first local scheduler of a plurality of local schedulers of the processor, work items from the shared cache responsive to an indication from the global scheduler of the processor;
   transferring, by the processor, a selected work item from the first local scheduler to a second local scheduler of the plurality of local schedulers, wherein said transferring comprises:
   causing the first local scheduler to store the selected work items in the shared cache; and conveying an indication to the second local scheduler that causes the second local scheduler to retrieve the selected work items from the shared cache.

10. The method as recited in claim 9, further comprising storing, by the local scheduler, work items to be executed in a local cache.

11. The method as recited in claim 10, further comprising launching, by a dispatch controller, the work items from the local cache to the processors.

12. The method as recited in claim 11, further comprising monitoring, by the dispatch controller, a command queue configured to store a command from the local scheduler that indicates the work items ready for execution have been stored in the local cache.

13. The method as recited in claim 9, further comprising the local scheduler scheduling the one or more work items independent of one or more other local schedulers of the processor, wherein the global scheduler is a first level of a hierarchical scheduler, and the local scheduler and the one or more other local schedulers are a second level of the hierarchical scheduler.

14. The method as recited in claim 9, wherein to schedule the one or more work items for execution, the method comprises the global scheduler:

storing the one or more work items in the shared cache; and conveying an indication to a first local scheduler of a plurality of local schedulers, to cause the first local scheduler to retrieve the one or more work items from the shared cache.

15. The method as recited in claim 14, wherein the indication identifies a location in the shared cache where the one or more work items are stored.

16. The method as recited in claim 9, wherein the processor is configured to transfer the selected work without direct communication between the first local scheduler and the second local scheduler.

17. A computing system comprising:

a processor comprising:

a shared cache;

a global scheduler comprising circuitry configured to store one or more work items in the shared cache;

a plurality of local schedulers including at least a first local scheduler and a second local scheduler, each coupled to a plurality of processors; and circuitry configured to cause selected work items of the first local scheduler of the plurality of local schedulers to be transferred to the second local scheduler of the plurality of local schedulers;

wherein the processor is configured to transfer the selected work items without direct communication between the first local scheduler and the second local scheduler.

18. The computing system as recited in claim 17, wherein in response to detecting an indication from the global scheduler, a local scheduler of the plurality of local schedulers comprises circuitry configured to:

retrieve one or more work items from the shared cache; and schedule the one or more work items for execution.

19. The processor as recited in claim 1, wherein the selected work item comprises a work item generated by at least one of:

a workgroup processor executing a previously scheduled work item; or an application or host processor that provides commands to the global scheduler.

20. The method as recited in claim 9, wherein the selected work item comprises a work item generated by at least one of:

a workgroup processor executing a previously scheduled work item; or an application or host processor that provides commands to the global scheduler.

21. The processor as recited in claim 1, wherein the transfer of the selected work item is performed responsive to a load condition of a local scheduler, the load condition comprising at least one of:

an overload condition in which the first local scheduler has an excess of work items; or an underutilization condition in which the second local scheduler has insufficient work items.

22. The method as recited in claim 9, further comprising transferring the selected work item responsive to a load condition of a local scheduler, the load condition comprising at least one of:

an overload condition in which the first local scheduler has an excess of work items; or an underutilization condition in which the second local scheduler has insufficient work items.

* * * * *